United States Patent [19]

Basso et al.

[11] Patent Number: 4,736,364

[45] Date of Patent: Apr. 5, 1988

[54] SWITCHING SYSTEM CONTROL ARRANGEMENTS

[75] Inventors: Richard J. Basso, Naperville; Laurence E. Burley, Aurora; Gregory S. DeWitt, Buffalo Grove; John J. Driscoll, 40, Naperville; David W. Kelly, Glen Ellyn; Robert A. Trygar, Winfield, all of Ill.

[73] Assignee: American Telephone and Telegraph Company, AT&T Bell Laboratories, Murray Hill, N.J.

[21] Appl. No.: 839,327

[22] Filed: Mar. 12, 1986

[51] Int. Cl.⁴ .................................................. H04J 3/12
[52] U.S. Cl. .................................... 370/68.1; 370/110.1
[58] Field of Search ................. 370/60, 94, 110.1, 68.1

[56] References Cited

U.S. PATENT DOCUMENTS

| | | | |
|---|---|---|---|
| 4,268,722 | 5/1981 | Little et al. | 370/110.1 |
| 4,388,718 | 6/1983 | Gerke et al. | 370/110.1 |
| 4,512,015 | 4/1985 | Kano et al. | 370/110.1 |
| 4,525,837 | 6/1985 | Tan et al. | 370/94 |
| 4,603,416 | 7/1986 | Servel et al. | 370/94 |
| 4,646,287 | 2/1987 | Larson et al. | 370/94 |

OTHER PUBLICATIONS

"ISDN User-Network Interfaces: Layer 2 Recommendations", *CCITT Integrated Services Digital Network (ISDN)*, 1985, Series 1, vol. 3, Section 4, pp. 187–237.

*Primary Examiner*—Douglas W. Olms
*Assistant Examiner*—Frank M. Scutch, III
*Attorney, Agent, or Firm*—Kenneth H. Samples

[57] ABSTRACT

Methods and arrangements for associating control messages received in the D-channel of an integrated services digital network (ISDN) line with the call control process to which the message relates are disclosed. With ISDN, a single control channel, called the D-channel, can be used concurrently to control a plurality of calls. As each call is initiated, a call control process and data structure including the unique identity of the call, are created. The data structures associated with the same D-channel are linked together. When a control message including a given identity is received, the data structures associated with the D-channel conveying the message are searched in sequence until a data structure having the given identity is found. The contents of this data structure are used to access the control process associated therewith. When the search reveals no matching identity and the message is a call setup message, a new process and data structure are created.

12 Claims, 4 Drawing Sheets

SWITCHING SYSTEM CONTROL ARRANGEMENTS

TECHNICAL FIELD

This invention relates to data communication systems, and more particularly, to arrangements for coordinating control information when a given channel can be used for more than one concurrent communication.

BACKGROUND OF THE INVENTION

Communication systems are known in which a single data channel can be used concurrently for multiple communications. One such type of system is an Integrated Services Digital Network (ISDN). With ISDN, terminal equipment can be connected to the network by two 64 Kbps channels (B-channel) and one 16 Kpbs channel (D-channel). The B-channel information is primarily circuit switched, voice, or data. The information in the D-channel is accumulated in the network to be packet switched. The D-channel information can be packet switched data or it can be control information, which is used by the network to control the switching of the B- and D-channels. Accordingly, the D-channel can be engaged in multiple concurrent communications to control multiple D-channel packet communications and the B-channel communications. Additionally, multiple user terminals may be connected to a single incoming line increasing even further the number of concurrent uses of a single D-channel.

Each active communication in a switching system is associated with a call control program and stored data describing the present state of the communication. Whenever a call-related stimulus is received, the appropriate data must be located and associated with the appropriate call control program. When a large number of D-channels is in use and each is being used for a number of communications, the total amount of stored call describing data becomes very large. Searching this data for the appropriate data and call control program becomes a difficult and time-consuming task. This is particularly troublesome in systems where the channel in which the stimulus is received does not uniquely identify the communication to which it relates. We propose an efficient method and arrangement for storing communication related data and for searching such data in systems where multiple communications may be controlled by information from a single channel.

SUMMARY OF THE INVENTION

The aforementioned problem is solved and a technical advance is achieved in accordance with the principles of the present invention. In an arrangement comprising a plurality of user access lines each connecting at least one user terminal to a switching arrangement, the user access lines being capable of multiple concurrent communications and each user terminal being associated with at least one data channel for conveying information relating to the communications conveyed by the user access lines, the method of creating a control process for each communication in the arrangement; creating a data structure for each active communication in the arrangement, each data structure including the unique identity of the associated communication and the identity of the control process associated therewith; transmitting by one of the user terminals a first message relating to a given communication in the data channel associated with that user terminal, the first message including the unique identity of the given communication; and searching in response to the first message only those data structures associated with the data channel conveying the first message to locate the data structure including the unique identity.

In one embodiment of the present invention the data channel is the D-channel of an ISDN user access line. As data structures are created, they are linked in sequence to other data structures relating to communications being controlled by information in the same D-channel. When a message is received, the identity of the D-channel conveying it is used to determine the address of the first of the data structures associated with that D-channel. The data structures are then searched in sequence, as determined by link addresses, until a data structure is found having the same unique identity as the received message or the end of the link structure is reached without a matching identity being found. When a matching unique identity is found, the identity of the associated control process is used to access that control process which makes use of the received message. Alternatively, when the end of the link structure is reached without a match, a new control process and associated data structure are created. The new data structure is linked to the last of the preexisting data structures relating to the same D-channel. This new data structure includes the unique identity of the received message and the identity of the associated control process.

BRIEF DESCRIPTION OF THE DRAWING

A more complete understanding of the present invention may be obtained from a consideration of the following description when read in conjunction with the drawing in which.

DETAILED DESCRIPTION

Figure 2:
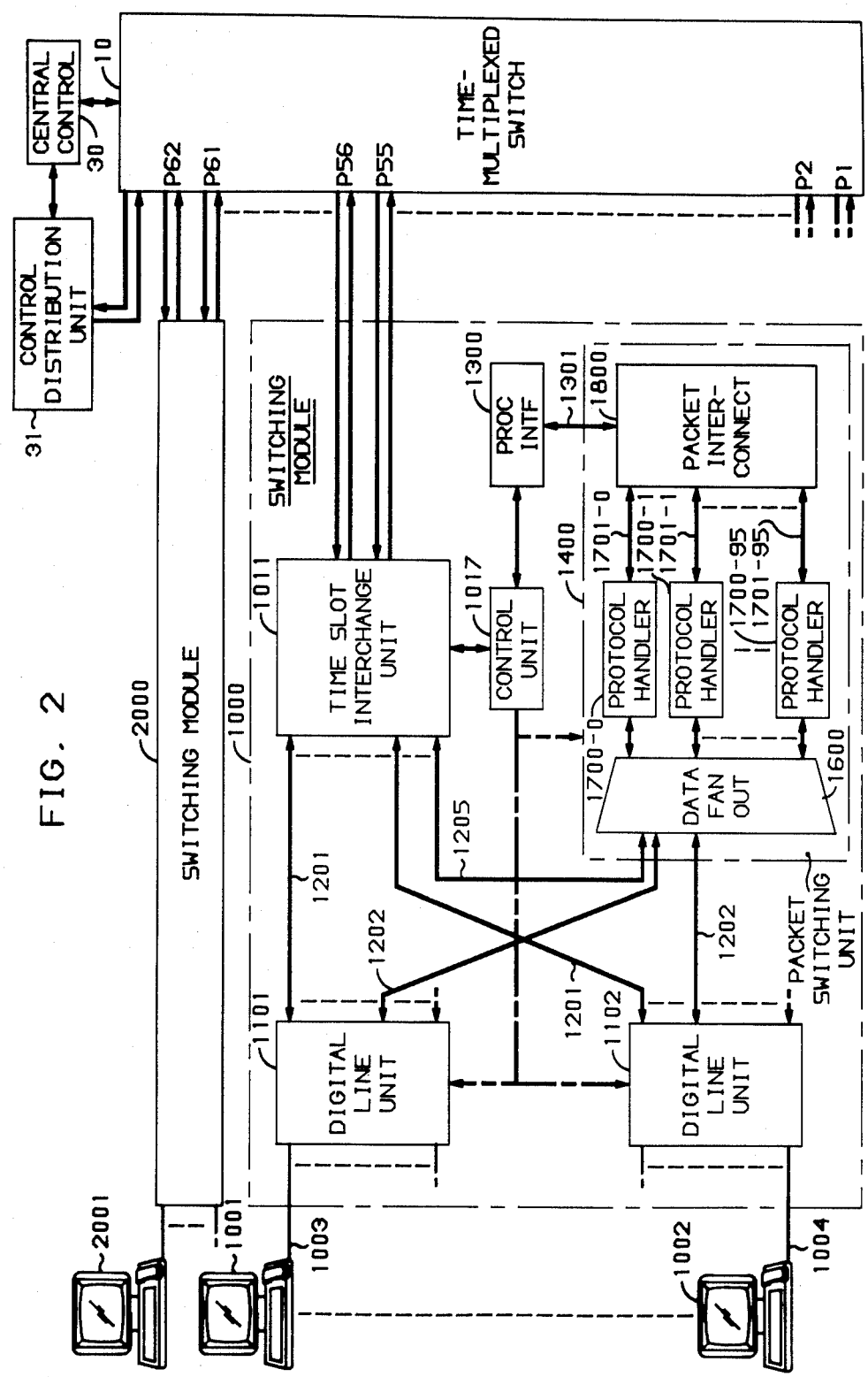
FIG. 2 is a block diagram of a switching system employing the present invention.

FIG. 2 presents a block diagram of an exemplary switching system illustrating the principle of the present invention. The system includes two switching modules 1000 and 2000, to provide both circuit switching and packet switching service to a plurality of user terminals e.g., 1001, 1002, 2001, representing, for example, customer teleterminals, vendor databases, telephone operator position terminals or packet access ports. Only switching module 1000 is shown in detail in FIG. 2. Each user terminal, e.g., 1001, transmits information to and receives information from its associated switching module, e.g., 1000, in two 64 kilobits per second channels referred to as B-channels and in one 16 kilobits per second channel referred to as a D-channel. In the present embodiment, the B-channels can be used to convey digitized voice samples at the rate of 8000, eight-bit samples per second and/or to convey data at a rate of 64 kilobits per second. Each B-channel is separately circuit-switched by the system to other user terminals, e.g., 1002 and 2001. The D-channel is used both to convey signaling packets to effect control message signaling between user terminals and the system and to convey data packets among user terminals. The D-channel is packet-switched by the system either to other user terminals or to a control unit 1017 which controls the establishment of both circuit-switched calls and packet-switched calls within switching module 1000.

In the present exemplary embodiment, information is conveyed between a user terminal, e.g., 1001, and switching module 1000 via a four-wire, user access line 1003 using one pair of wires for each direction of transmission. User line 1003 transmits a serial bit stream at the rate of 192 kilobits per second which comprises 144 kilobits per second for the above-mentioned two 64 kilobits per second B-channels and one 16 kilobits per second D-channel and which further comprises 48 kilobits per second used for a number of functions including framing, DC balancing, control and maintenance. User line 1003 represents what is referred to by the International Telegraph and Telephone Consultative Committee (CCITT) as the T-interface. The use of the T-interface in the present system is only exemplary. The invention is equally applicable to systems using other access methods.

In switching module 1000, the user lines, e.g., 1003 and 1004, are terminated by two digital line units 1101 and 1102. Information is conveyed between each of the digital line units 1101 and 1102 and a time-slot interchange unit 1011 via a plurality of 32-channel bidirectional time-multiplexed buses 1201. Information is also conveyed between each of the digital line units 1101 and 1102 and a packet switching unit 1400 via a plurality of 32-channel bidirectional time-multiplexed data buses 1202. The buses 1201 are used primarily to convey B-channel information which is circuit switched by time-slot interchange unit 1011 either to user terminals served by switching module 1000 or to other switch modules via time-multiplexed switch 10 in a manner well known in the art. However, the buses 1201 are also used to convey D-channel information which is further conveyed via predetermined time-slot interchange unit 1011 channels and via a 32-channel bidirectional data bus 1205 to packet switching unit 1400. Each channel or time slot on the buses 1201 can include eight B-channel bits from one user terminal or two D-channel bits from each of four different user terminals. The data buses 1202 are used to convey D-channel information. Each channel or time slot on the data buses 1202 and 1205 can include two D-channel bits from each of four different user terminals.

In the present exemplary embodiment, packet switching unit 1400 includes a data fan-out arrangement 1600, 96 protocol handlers 1700-0 through 1700-95, and packet interconnect 1800 which interconnects protocol handlers 1700-0 through 1700-95 and a processor interface 1300. Each user terminal, e.g., 1001, is associated with one of the protocol handlers 1700-0 through 1700-95 and, more particularly, with one of 32 High-level Data Link Control (HDLC) circuits, (not shown), included in that associated protocol handler. In the present embodiment, communication links are established between the HDLC circuits of the protocol handlers and peer HDLC circuits (not shown) in the user terminals. These links are used to convey packets within HDLC frames in accordance with the well-known HDLC protocol. The connections between a given protocol handler and its associated D-channels on data buses 1202 and 1205 are completed by data fan-out arrangement 1600.

The packets conveyed on the D-channel communication links between user terminals and associated protocol handlers are of variable length. Each user terminal, e.g., 1001, transmits and receives packets in one or more logical communication channels. The logical channel of a given packet is identified by a logical channel number which is a part of the header of that packet. Each packet received by a protocol handler from a user terminal is stored in a random access memory (RAM), (not shown) in that protocol handler. A signaling packet of the type used for call control, includes information defining the packet as signaling information. A packet which is used for data communication includes information defining it as a data packet. A protocol handler sends signaling packets to processor interface 1300 via a packet interconnect 1800. Processor interface 1300 is similar in structure to protocol handlers 1700-0 through 1700-95. It receives and buffers data packets from packet interface 1800 and notifies control unit 1017 when a packet is received. Processor interface 1300 also receives information from control unit 1017 and prepares packets for transmission to packet interface 1800. If a packet received from a user terminal, e.g., 1001, is a data packet, and a packet-switched call has previously been established, it is transmitted via packet interconnect 1800 to the protocol handler associated with the destination user terminal for subsequent transmission thereto. (If the packet-switched call is established between two user terminals that are associated with the same protocol handler, the data packets need not be transmitted via packet interconnect 1800. Instead, the protocol handler simply transmits the data packets in the appropriate channel to the destination user terminal.)

When a given protocol handler, e.g., 1700-0, has received a complete packet from a user terminal and has determined the destination of that packet, i.e., either one of the other protocol handlers or processor interface 1300, it transmits a logic zero Request To Send (RTS) signal, also referred to herein as a request signal, on one conductor of a six-conductor bus 1701-0 to packet interconnect 1800. Similarly, when processor interface 1300 has a packet ready for transmission to one of the protocol handlers, it transmits a logic zero RTS signal on one conductor of a six-conductor bus 1301. Packet interconnect 1800 enables each of the protocol handlers and the processor interface 1300 to transmit in a predetermined sequence. Since processor interface 1300 transmits signaling packets to all of the user terminals served by switching module 1000, the sequence effected by packet interconnect 1800 enables processor interface 1300 sixteen times for each enabling of an individual protocol handler. When the packet interconnect 1800 sequence reaches protocol handler 1700-0, packet interconnect 1800 responds to the RTS signal on bus 1701-0 by transmitting a logic zero Clear To Send (CTS) signal, also referred to herein as a clear signal, on a second conductor of bus 1701-0 to protocol handler 1700-0. Protocol handler 1700-0 responds to the CTS signal by transmitting its stored packet at a high rate, e.g., 10 megabits per second, via packet interconnect 1800 to its destination. All of the protocol handlers and the processor interface 1300 can receive the packet, but in the present embodiment, typically only one destination as defined by the packet header actually stores the packet for subsequent use or transmission. Only after the complete packet has been transmitted by protocol handler 1700-0, does the packet interconnect 1800 sequence resume. The receipt of the packet by the destination protocol handler or by processor interface 1300 is acknowledged by the transmission of an acknowledgement packet back to protocol handler 1700-0. Switching module 2000 is substantially identical to switching module 1000. The protocol handlers 1700-0 through 1700-95 and the processor interface 1300 in switching module 1000 are referred to herein as packet switching nodes since they accumulate received data bits into packets and subsequently transmit the packets on toward their destinations. In the present example, protocol handlers 1700-0 and 1700-2 through 1700-95 are connected to the D-channels from user terminals and are referred to as user packet switching nodes. Since processor interface 1300 is connected to convey control information to and from control unit 1017, processor interface 1300 is referred to as a control packet switching node. One protocol handler in each switching module, e.g., protocol handler 1700-1 in switching module 1000 is used for switching data packets for inter-module packet calls and is referred to as an intermediate packet switching node.

In the present embodiment, four channels on data bus 1205 are connected at system initialization by time-slot interchange unit 1011 to four channels, e.g., channels 109 through 112, at input/output port pair P55 of time-multiplexed switch 10. Time-multiplexed switch 10 includes information defining that a bidirectional communication path is to be established between input/output port pairs P55 and P61 during channels 109 through 112 of each time-multiplexed switch 10 cycle. By the use of these predefined connections, protocol handler 1700-1 can transmit communication packets with switch module 2000.

Control unit 1017, in cooperation with central control 30, controls switching functions relating to the user terminals, e.g., 1001 and 1002, connected to switching module 1000. Control unit 1017 communicates with central control 30 using control channels through time-multiplexed switch 10 and control distribution unit 31 in a known manner. When a connection is to be established in switching module 1000, a call control process is created in control unit 1017. This call control process is uniquely associated with the requested call and is used to accumulate and distribute information to complete and record the call. The following is a discussion of the methods and arrangements employed in the present embodiment for associating call control processes with calls and for finding the correct process to handle switching functions when the need arises. When a user terminal, e.g., 1001, wishes to establish a call, it first formulates a packet, called a setup packet, to be transmitted in the D-channel associated with user terminal 1001. This setup packet includes several fields in addition to the actual call setup message. Among these additional fields is a Terminal Endpoint Identifier (TEI), a Service Access Point Identifier (SAPI) and a call reference value. Each user terminal is associated with at least one TEI. Additionally, it is possible that a given user terminal may comprise more than one terminal endpoint and thus be associated with more than one TEI. The TEIs are selected such that no two user terminals connected to the same user access line have the same TEI. The SAPI is used to identify the type of message containing it. In the present embodiment, an SAPI of 0 indicates that the associated message is a signaling message, an SAPI of 16 indicates that the associated message is a packet switching data or control message. Thus, a call setup packet includes an SAPI of 0 indicating that it is the signaling packet. The call reference value is selected by user terminal 1001 to distinguish the call from other D-channel calls from the same user terminal. It should be noted that with regard to a given D-channel the combination of the TEI and call reference value uniquely identify a call.

Once the setup packet is formulated, it is transmitted (block 4050, FIG. 3) to digital line unit 1101 in the D-channel of user access line 1003. Digital line unit 1101 in cooperation with data fanout 1600, routes the packet to a predetermined HDLC circuit (not shown) of a predetermined protocol handler, e.g., 1700-0, of packet switching unit 1400. The protocol handler 1700-0 reads the SAPI to determine the type of the associated message. Since the packet is a signaling packet, protocol handler 1700-0 formulates a packet to be sent to processor interface 1300. The packet to be transmitted includes most of the information of the received packet, and additionally includes the identity of the protocol handler 1700-0 (PHI), the identity of the particular HDLC circuit (HDLCI), and the particular D-channel, e.g., D-1, being used for the call. After formulation, the new packet is transmitted (block 4051, FIG. 3) to processor interface 1300 via packet interconnect 1800 as discussed above. Processor interface 1300 receives and stores the signaling packet and notifies control unit 1017 of its arrival (block 4052, FIG. 3). In the present embodiment, each active call is associated with a call control process in control unit 1017. This call control process remains until the call associated therewith is disconnected. The call control process responds to stimuli from various controllers and user terminals to set up, maintain, and disconnect the call that it is associated with. Accordingly, a given process must respond to all stimuli relating to its associated call. Efficiently finding the particular call control process for each incoming D-channel packet is a difficult problem especially when more than one call can be controlled by the same D-channel.

Figure 1:
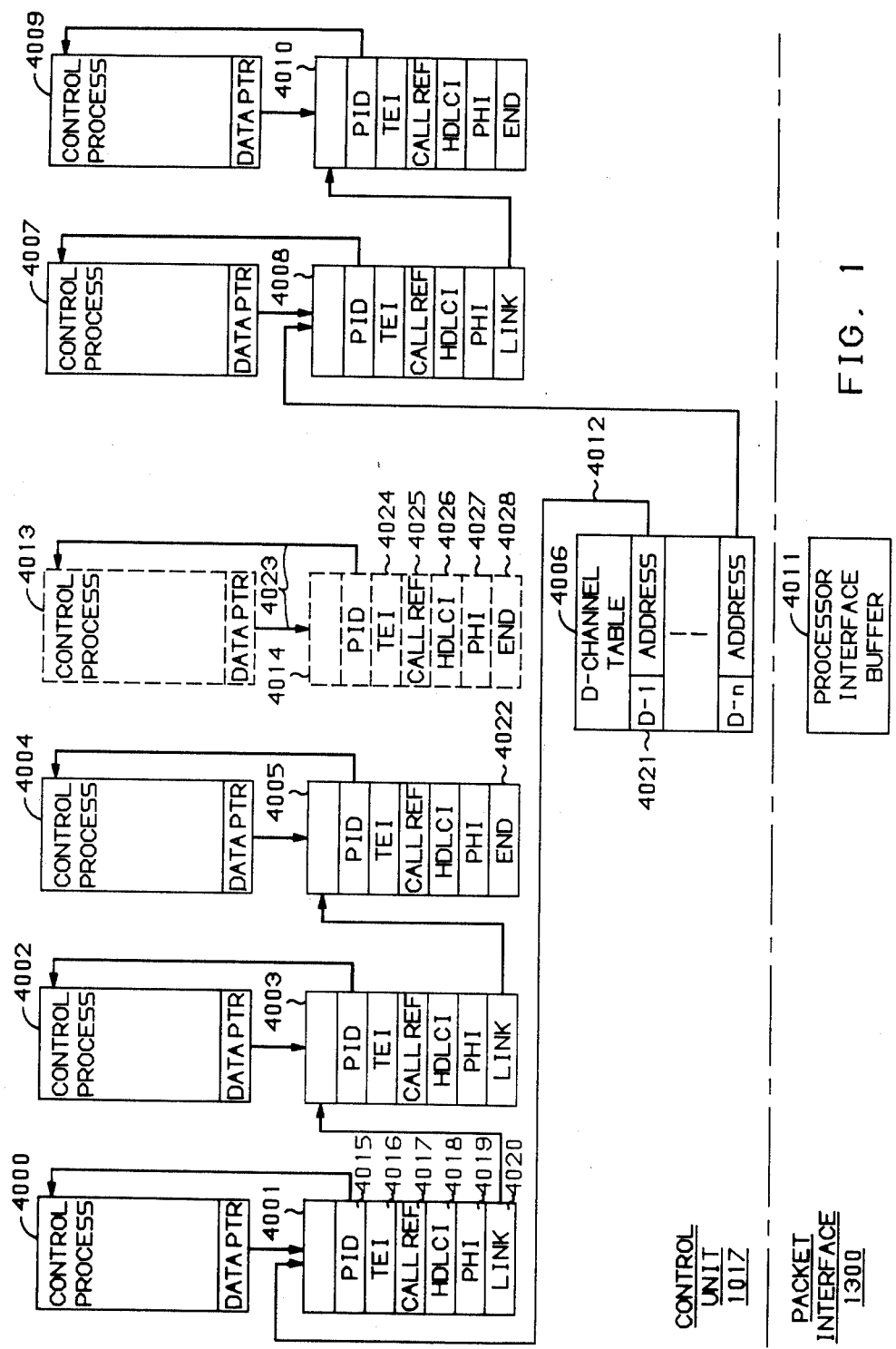
FIG. 1 is a representation of control processes and data structures used in the present invention.

When a call control process is created, a data structure is also created which contains the identity of the associated process. In the present example, a data structure is created by allocating a previously initialized memory block. FIG. 1 represents the association of control processes, e.g., 4000, and data structures, e.g., 4001. Each control process and the associated data structure is associated with a particular user terminal, e.g., 1001 (FIG. 2), and is accordingly associated with a particular D-channel. In accordance with the present embodiment, each data structure, e.g., 4001, contains the process identity (PID) 4015 of the associated control process as well as the TEI 4016, the call reference value 4017, the HDLCI 4018, and the PHI 4019 of the call being served by the process. Additionally, each data structure is sequentially linked by a link address 4020 to a data structure associated with a call using the same D-channel. The first data structure associated with a given D-channel is pointed to by information stored in a D-channel table 4006. D-channel table 4006 comprises a plurality of entries each entry relating to an existing D-channel, and being labeled from D-1 to D-n. Each entry e.g. 4021 in the D-channel table has associated therewith the address of the first data structure associated with the identified D-channel. FIG. 1 represents three call control processes 4000, 4002, and 4004, and their respectively associated data structures, 4001, 4003, and 4005, all being associated with a D-channel D-1. The address stored in location 4021 of D-channel table 4006, which is associated with D-channel D-1 points to the data structure 4001, which in turn is linked to data structure 4003, which is in turn linked to data structure 4005. It will be noted that data structure 4005 is linked to no subsequent data structure and its link storage area 4022 is marked END. FIG. 1 also represents the control processes 4007 and 4009, which are respectively associated with the linked data structures 4008 and 4010. The last-named processes and data structures are associated with D-channel D-n as shown in D-channel table 4006.

It will be remembered that a signaling packet was sent to processor interface 1300 identifying D-channel D-1 in response to a call setup message from user terminal 1001. This packet is stored in process interface buffer 4011. Additionally, control unit 1017 was notified of the arrival of this packet. Control unit 1017 responds to this notice by reading the D-channel identifying portions of the received packet (block 4053, FIG. 3) and using this information to access D-channel table 4006 to find the address of the first data structure associated with channel D-1 (block 4054, FIG. 3). This address is used to access data structure 4001 (block 4055, FIG. 3) as indicated by arrow 4012. As previously stated, the TEI and call reference value included in a data structure uniquely identify the particular call associated with that data structure. The TEI 4016 and call reference value 4017 stored in data structure 4001 are compared (block 4056, FIG. 3) with the TEI and call reference value contained in the packet stored in interface buffer 4011. There will be no match since the incoming packet is the first message relating to a call and no data structure should yet have been created for this call. Accordingly, the link value 4020 stored in data structure 4001 is used to access data structure 4003 (block 4058, FIG. 3). Again, a comparison is performed and no match is found. These comparisons continue with subsequent data structures, e.g. 4005, until a link value 4022 defining the end of the link structure is found (block 4057, FIG. 3). Control unit 1017 responds to the END link value 4022 found in data structure 4005 by checking (block 4067, FIG. 3) to determine if the message relates to a new service request. Since, in the present example, the incoming message is a call setup message, a new call control process 4013, and an associated data structure 4014 are created (block 4059, FIG. 3). The new data structure 4014 and control process 4013 are shown as dotted boxes in FIG. 1. The new process 4013 is linked 4023 to the new data structure 4014 and the data structure is linked (not shown in FIG. 1) to data structure 4005 (block 4060, FIG. 3). Additionally, the TEI 4024, call reference value 4025, HDLCI 4026, and PHI 4027 from the signaling packet in processor interface buffer 4011 are stored in the data structure as well as a link address END 4028 defining the end of the link structure. Certain special services may be provided with messages which do not require individual control processes. Accordingly, when the end of a linked structure is found and the received message is not a new service message, a check is performed (block 4063, FIG. 3) to determine if the message is a special service request or an error.

When the signaling packet stored in interface buffer 4011 relates to an existing call, the data structures associated with the D-channel of the call are searched in sequence until a match of the TEI and call reference value occurs. The process identity PID of the data structure with the matching values is used to access (block 4061, FIG. 3) the associated control process. Such accessing may consist of notifying the identified process of the message in interface buffer 4011. The associated control process then reads processor interface buffer 4011 and utilizes this information to establish, maintain, or release connections.

Control unit 1017 can also transmit signaling messages to user terminals. To do so, the relevant call control process accesses its associated data structure to determine the TEI, call reference value, HDLCI, and PHI associated with the call. This information is used to construct a packet, which is sent via the processor interface 1300 to packet switch unit 1400 and then to the defined user terminal as above-described.

Figure 3:
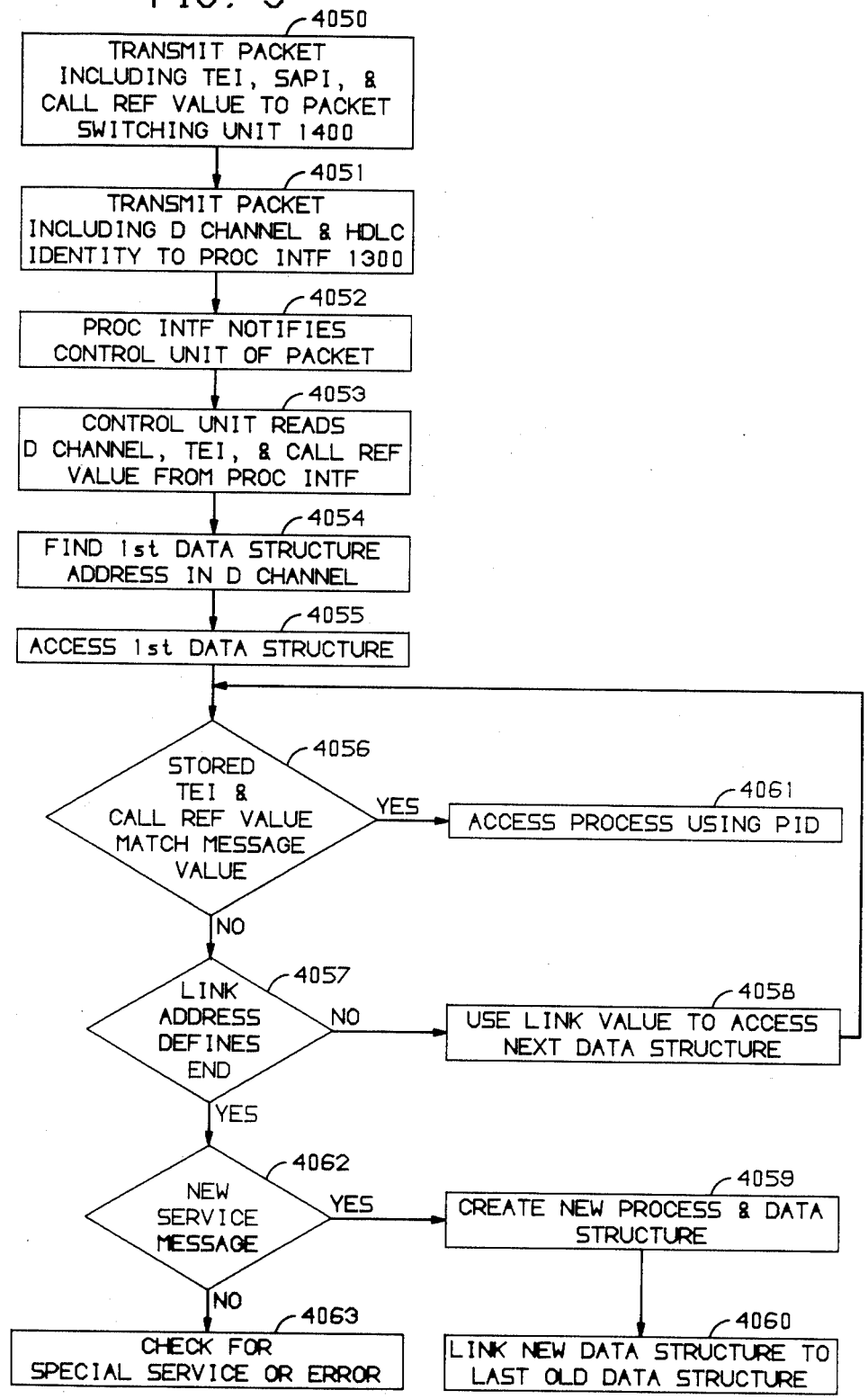
FIG. 3 is a flow diagram showing the basic operation of coordinating messages with data structures and control processes.
Figure 4:
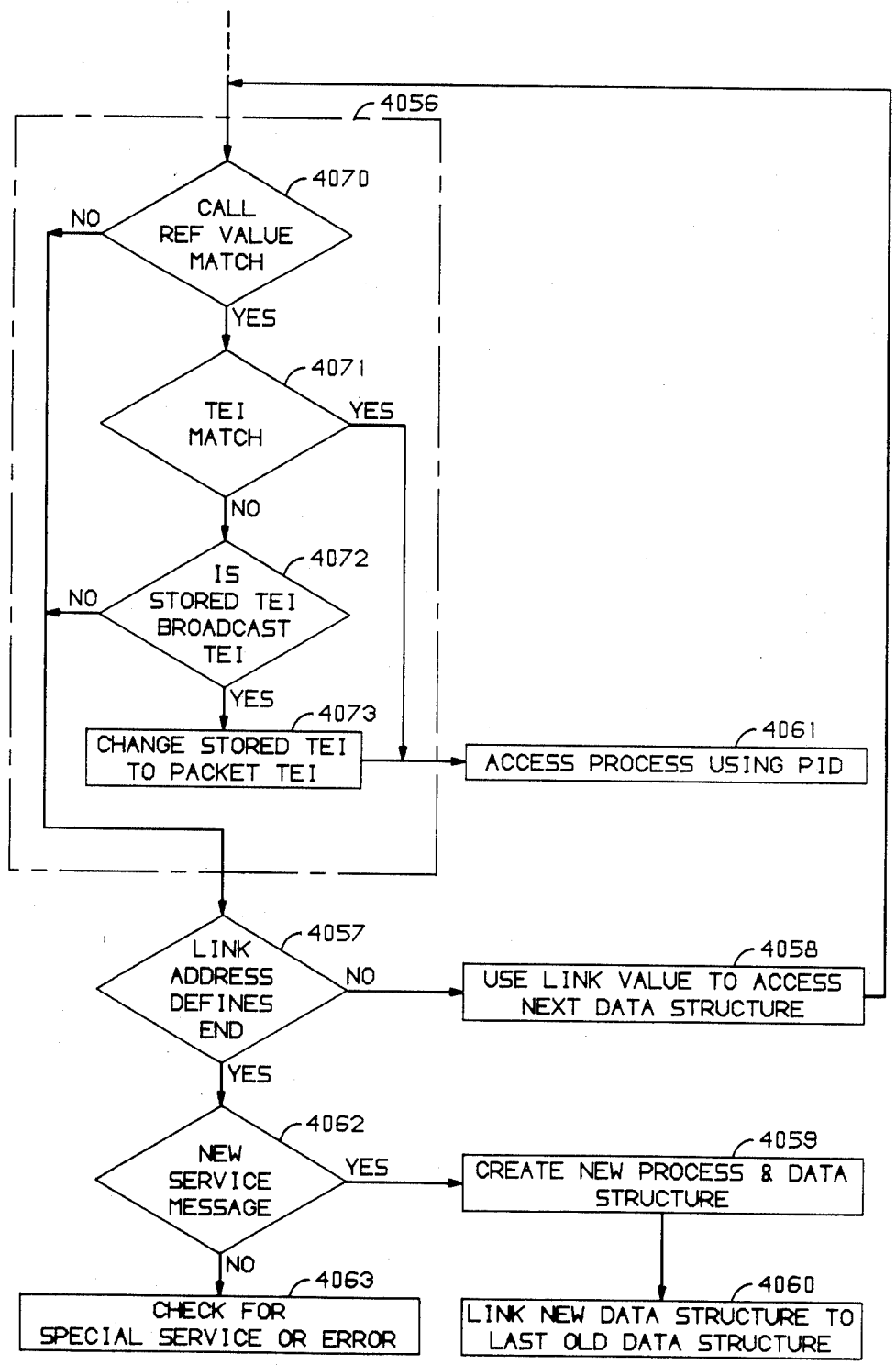
FIG. 4 is a flow diagram emphasizing an embodiment of one of the action blocks of FIG. 3.

As previously stated, every user terminal has a TEI which is unique on a given user access line. By convention, a predetermined TEI, called the broadcast TEI is never associated with a specific user terminal. The broadcast TEI is used when a control unit, e.g., 1017 receives an external request for communication. The following example in conjunction with FIG. 4 relates to the use of the broadcast TEI and also shows a more detailed embodiment of the search method described with regard to FIG. 1. In accordance with the present example, an external request for communication is received defining the user access line 1003. When such a request is received, control unit 1017 creates a call control process, e.g., 4004, and a data structure, e.g., 4005, as above-described, and links the data structure to other data structures associated with the same D-channel. From data stored in the control unit 1017, the HDLCI and PHI for the connection are determined. Control unit 1017 then stores in the data structure the broadcast TEI, a call reference value selected by control unit 1017, and the HDLCI and PHI as determined above. A call setup packet is formulated using this information which packet is transmitted to the destination D-channel on user access line 1003 as above-described. All user terminals connected to a given user access line can, by convention, respond to the broadcast TEI. Accordingly, user terminal 1001 receives and responds to the signaling packet including the broadcast TEI. In order to specifically identify the new call, user terminal 1001 returns a signaling packet (alerting message) to the processor interface 1300 having the call reference value selected by control unit 1017 and including the TEI of user terminal 1001 (not the broadcast TEI). Control unit 1017 responds to the alerting message by searching the data structures associated with the D-channel identified by the alerting message. FIG. 4 is a flow diagram of a more detailed search method. The dotted block labeled 4056 in FIG. 4 can be substituted for action block 4056 of FIG. 3. In FIG. 4, the action blocks having the same function as equivalent action blocks in FIG. 3 are given the same numerical designation.

Initially, the call reference value 4017 of data structure 4001 is compared (block 4070, FIG. 4) with the call reference value of the received packet. There will be no match and the next data structure 4003 will be searched as previously described. When data structure 4005 is searched, the call reference values will match. Then a comparison (block 4071, FIG. 4) is made to determine if the TEIs match. In the present example, the TEIs will not match since the stored broadcast TEI does not match the TEI of user terminal 1001. Accordingly, a check is performed (block 4072, FIG. 4) to determine if the stored TEI is the broadcast TEI. Since the stored TEI is the broadcast TEI, the stored TEI is replaced (block 4073, FIG. 4) with the TEI in the packet from user terminal 1001 and the control process associated with the data structure being searched is accessed (block 4061, FIG. 4). All further packets relating to this call will include the TEI of user terminal 1001 now stored in the data structure 4005.

If it were found in block 4072, FIG. 4, that the stored TEI did not match the broadcast TEI, then the search sequence would continue by returning to action block 4057 to determine if the end of the list had been found. Additionally, if there had been a match of TEIs in block 4071, the procedure would have accessed the associated process (block 4061, FIG. 4) as described above.

What is claimed is:

1. In an arrangement comprising a plurality of user access lines each connecting at least one user terminal to a switching arrangement, said user access lines being capable of multiple concurrent communications each having a unique identity and each user terminal being associated with at least one data channel for conveying information relating to the communications conveyed by the user access lines, the method comprising the following steps:

creating a control process for each active communication in said arrangement;

creating a data structure for each active communication in said arrangement, each data structure including the unique identity of the associated communication and the identity of the control process associated therewith;

transmitting by one of said user terminals a first message relating to a given communication in the data channel associated with that user terminal, said first message comprising the unique identity of the given communication; and searching, in response to said first message, only those data structures associated with the data channel conveying said first message to locate the data structure including the unique identity of said given communication.

2. The method in accordance with claim 1 further comprising the step of accessing the control process identified in the data structure located in said searching step.

3. The method in accordance with claim 1 further comprising the following steps when said searching step fails to locate a data structure including the unique identity of said given communication:

creating a call control process for said given communication; and creating a data structure for said given communication said data structure including the unique identity of said given communication and the identity of the control process associated with said given communication.

4. The method in accordance with claim 1 further comprising:

linking each data structure to other data structures associated with the same data channel and said searching step comprises:

identifying a first of said data structures associated with the data channel conveying said first message; and searching said first of said data structures and each data structure linked thereto until a data structure including the unique identity of said given communication is found.

5. The method in accordance with claim 1 further comprising the steps of:

reading, by a first control process, the unique identity of the communication included in the one of said data structures associated with said first control process; and transmitting a second message in the data channel associated with said first control process, said second message comprising the unique identity of the communication associated with said first control process.

6. In an arrangement comprising a plurality of terminal end points, each having a unique terminal end point identifier, connected to a switching network by access lines, said access lines being capable of a plurality of concurrent communications, each communication being associated with a data channel for conveying control information packets to said switching network for controlling connections therethrough, the method comprising:

creating a control process for each communication in said network;

creating a data structure for each communication in said network, each data structure including the terminal end point identifier of the terminal end point of the associated communication, a call reference value, and the identity of the control process of the associated communication;

transmitting, by a given one of said terminal end points, a control information packet relating to a given communication in the one of said data channels associated with said given communication, said control information packet including the terminal end point identifier of the given terminal end point and a call reference value;

searching, in response to said control information packet, only those data structures relating to communications associated with the data channel conveying said control information packet to locate a data structure including the same terminal end point identifier and call reference value included by said control information packet.

7. The method in accordance with claim 6 further comprising the step of accessing the control process identified in a data structure located in said searching step.

8. The method in accordance with claim 6 wherein said transmitting step comprises:

transmitting by a given one of said terminal end points a control information packet relating to a given communication in the one of said data channels associated with said given communication, said control information packet including the terminal end point identifier of the given terminal end point and a call reference value selected by the terminal end point and said method further comprises the following steps when said searching step fails to locate a data structure including the same terminal end point identifier and call reference value included by said control information packet:

creating a control process for said given communication; and creating a data structure for said given communication, said data structure including the terminal end point identifier and call reference value included in said control information packet and the identity of the control process associated with said given communication.

9. The method in accordance with claim 6 further comprising:

linking each data structure to other data structures associated with the same data channel and said searching step comprises:

identifying a first of said data structures associated with the data channel conveying said control information packet message; and searching said first of said data structures and each data structure linked thereto until a data structure including the same terminal end point identifier and call reference value included by said control information packet is found.

10. In a communication system having a plurality of channels, a lesser plurality of said channels being capable of conveying data for a plurality of concurrent communications, each communication having a unique identity, an arrangement comprising:

a control process associated with each communication in said arrangement;

a data structure associated with each communication in said arrangement each data structure including the unique identity of the communication and call control process associated therewith;

means for transmitting a message for a given communication in a given one of said lesser plurality of channels, said message comprising the unique identity of said given communication; and searching means responsive to said message for searching only those data structures associated with said given one of said lesser plurality of channels to identify a control process associated with said given communication.

11. The arrangement in accordance with claim 10 wherein each data structure is linked to the other data structures associated with the same channel; and said searching means comprises means for identifying a first of said data structures associated with said given one of said lesser plurality of channels; and means for searching each linked data structure until a data structure including the unique identity of said given communication is found.

12. The arrangement in accordance with claim 10 further comprising control means operative when no data structure is associated with said given communication said control means comprising means for creating a call control process for said given communication; and means for generating a data structure for said given communication said data structure including the unique identity of said given communication.

* * * * *